US010951824B2

(12) United States Patent
Zhang

(10) Patent No.: US 10,951,824 B2
(45) Date of Patent: Mar. 16, 2021

(54) ELECTRONIC APPARATUS AND MOBILE TERMINAL

(71) Applicant: Guangdong OPPO Mobile Telecommunications Corp., Ltd., Guangdong (CN)

(72) Inventor: Gong Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/505,027

(22) Filed: Jul. 8, 2019

(65) Prior Publication Data

US 2020/0014850 A1 Jan. 9, 2020

(30) Foreign Application Priority Data

Jul. 9, 2018 (CN) .......................... 201810743954.X

(51) Int. Cl.
*H04N 5/232* (2006.01)
(52) U.S. Cl.
CPC ....... *H04N 5/23258* (2013.01); *H04N 5/2328* (2013.01); *H04N 5/23261* (2013.01)
(58) Field of Classification Search
CPC ............... G02B 27/646; G03B 5/00; G03B 2205/0015; H04N 5/23258; H04N 5/23287
USPC .......................................................... 396/55
See application file for complete search history.

(56) References Cited

U.S. PATENT DOCUMENTS

| 9,285,566 B2 * | 3/2016 | Chan .................. H02K 33/12 |
| 9,632,327 B2 * | 4/2017 | Chan .................. H04N 5/23258 |
| 2013/0021485 A1 * | 1/2013 | Hsu .................... G02B 27/64 |
| | | 348/208.99 |

(Continued)

FOREIGN PATENT DOCUMENTS

| CN | 103676405 A | 3/2014 |
| CN | 103969915 A | 8/2014 |
| CN | 104052932 A | 9/2014 |

(Continued)

OTHER PUBLICATIONS

Extended European search report issued in corresponding European application No. 19185287.0 dated Nov. 22, 2019.

(Continued)

*Primary Examiner* — Clayton E. LaBalle
*Assistant Examiner* — Warren K Fenwick

(57) ABSTRACT

An electronic apparatus may include a processor, a gyro, and an imaging module. The imaging module may be arranged separately from the gyro and the processor, and include a shell and a light reflection element, a mounting base, an image sensor and a driving device received in the shell. The light reflection element may be fixed on the mounting base and configured to reflect light incident from the light incident hole to reach the image sensor, so that the image sensor may sense the external light of the imaging module. Based on feedback data sent from the gyro, the processor may control the driving device to drive the mounting base carrying the light reflection element to rotate around a rotation axis, to achieve the optical image stabilization along an axial direction of the light incident hole. The rotation axis is perpendicular to the axial direction of the light incident hole.

19 Claims, 12 Drawing Sheets

(56) References Cited

U.S. PATENT DOCUMENTS

2013/0039642 A1   2/2013  Wang
2017/0082823 A1   3/2017  Hwang et al.

FOREIGN PATENT DOCUMENTS

| CN | 106405991 A | 2/2017 |
|----|-------------|--------|
| CN | 206039030 U | 3/2017 |
| CN | 106990551 A | 7/2017 |
| CN | 107357114 A | 11/2017 |
| CN | 107645624 A | 1/2018 |
| CN | 107659758 A | 2/2018 |
| CN | 107888834 A | 4/2018 |
| CN | 108124092 A | 6/2018 |
| CN | 108965663 A | 12/2018 |
| JP | 2017194531 A | 10/2017 |
| WO | 2016166730 A1 | 10/2016 |
| WO | 2017208090 A1 | 12/2017 |

OTHER PUBLICATIONS

First Office Action from China patent office in a counterpart Chinese patent Application 201810743954.X dated Sep. 30, 2019 (10 pages).
International search report issued in corresponding international application No. PCT/CN2019/094639, dated Sep. 20, 2019 (4 pages).
The National Intellectual Property Administration of People's Republic of China, Notification of Grant Patent for CN Application 201810743954.X, dated May 14, 2020 (7 pages).
India First Office Action for IN Application 201914026999 dated Jan. 18, 2021.

\* cited by examiner

ELECTRONIC APPARATUS AND MOBILE TERMINAL

CROSS-REFERENCE TO RELATED APPLICATION(S)

This application claims priority to Chinese Patent Application No. 201810743954.X, filed on Jul. 9, 2018, the contents of which are herein incorporated by reference in their entireties.

TECHNICAL FIELD

The present disclosure relates to the field of mobile terminals, and in particular to an electronic apparatus and a mobile terminal.

BACKGROUND

In the related art, in order to improve quality of photographing, camera module of mobile phones uses periscope-type lenses, which could offer 3× optical zoom, to capture photographs with higher quality. The periscope type lens includes a light reflection element, which reflects the incident light to an image sensor, so that the image sensor captures images out of the periscope type lens. In order to achieve the effect of optical image stabilization, a gyro and a driver integrated circuit (IC) are required to set within the camera module, resulting in a large sized periscope type lens.

SUMMARY

The present disclosure provides an electronic apparatus to solve the problem of the large sized periscope type lens.

According to an aspect of the present disclosure, the electronic apparatus may include a processor, a gyro, and an imaging module arranged on a mainboard of the electronic apparatus and separated from the gyro and the processor. The imaging module may include a shell defining a light incident hole; and a light reflection element, a mounting base, an image sensor and a driving device arranged in the shell. The light reflection element may be fixed on the mounting base and configured to reflect light incident from the light incident hole to the image sensor, such that the image sensor senses the incident light outside of the imaging module. The processor may be configured to control the driving device to drive the mounting base with the light reflection element to rotate around a rotation axis based on feedback data sent from the gyro, such that optical image stabilization along an axial direction of the light incident hole is achieved, and the rotation axis is perpendicular to the axial direction of the light incident hole.

According to another aspect of the present disclosure, the electronic apparatus may include a housing, an imaging module received in the housing, a gyro fixed in the housing and out of the imaging module, and a processor fixed in the housing and out of the imaging module. The imaging module may include a shell defining a light incident hole, a light diverting member received in the shell, rotatably connected to the shell, and configured to divert the light, and a imaging element received in the shell and configured to receive the diverted light and image. The gyro may be configured to detect shake of the electronic apparatus to obtain shaking data. The processor may be configured to control light diverting member to rotate based on the shaking data sent from the gyro. The rotation axis may be perpendicular to an axial direction of the light incident hole, and both the rotation axis and the axial direction of the light incident hole may be perpendicular to the photosensitive direction of the image.

According to further another aspect of the present disclosure, a mobile terminal may include a housing and a mainboard, a processor, a gyro, and an imaging module received in the housing. The processor, the gyro, and the imaging module may be arranged on the mainboard and separated from each other. The gyro may be configured to detect an action of the mobile terminal to obtain action data. The imaging module may include a shell defining a light incident hole; and a light reflection element, a mounting base, an image sensor and a driving device arranged in the shell. The light reflection element may be fixed on the mounting base and configured to reflect light incident from the light incident hole to the image sensor. The mounting base may be rotatably connected to the shell and configured to rotate around a rotation axis. The image sensor may have a photosensitive direction and be configured to sense incident light outside of the imaging module. The driving device may be configured to drive the mounting base to rotate. The processor may be configured to control the driving device to drive the mounting base to rotate around a rotation axis based on the action data sent from the gyro, such that the light reflection element rotates with the mounting base. The rotation axis may be perpendicular to an axial direction of the light incident hole, and both the rotation axis and the axial direction of the light incident hole may be perpendicular to the photosensitive direction of the image.

BRIEF DESCRIPTION OF DRAWINGS

The above mentioned and/or additional aspects and advantages of the present disclosure may become obvious and be clearly understood by the following description referring to appended figures.

DETAILED DESCRIPTION

Figure 1:
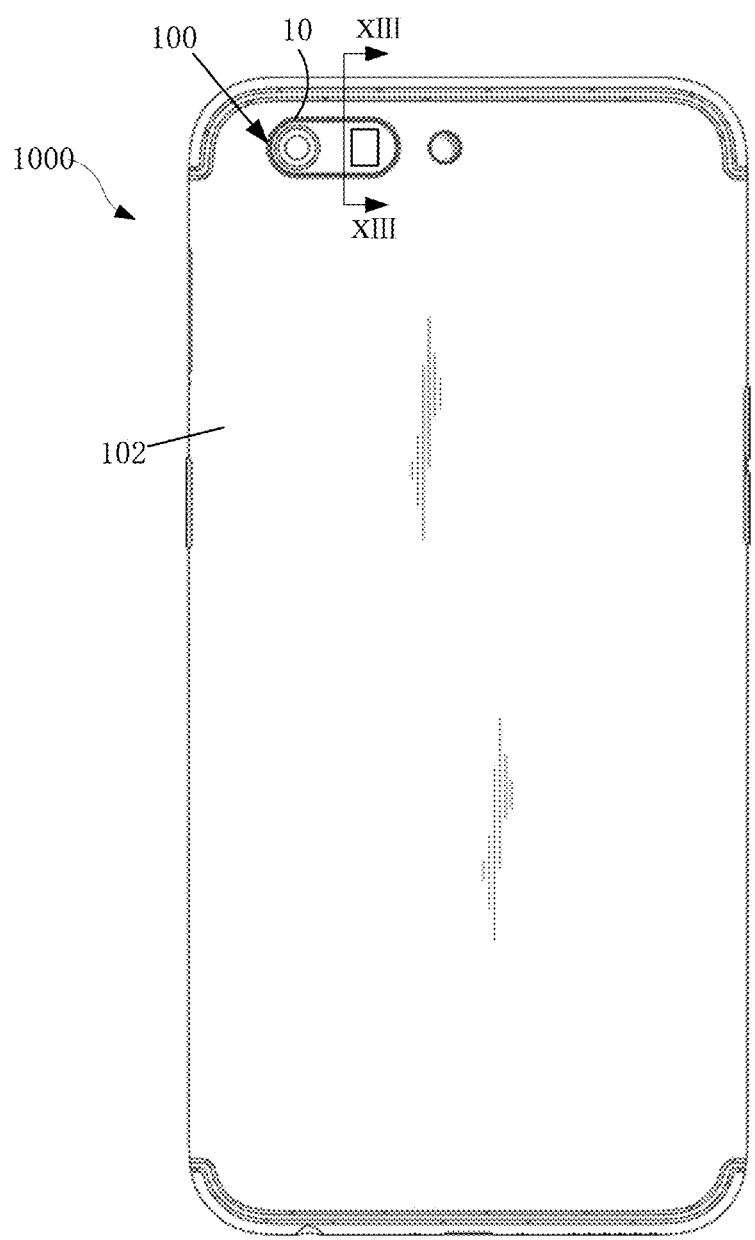
FIG. 1 is a back view of an electronic apparatus according to an embodiment of the present disclosure.

Reference will now be made in detail to embodiments of the present disclosure, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

To be understood that, in the present disclosure, terminologies used for describing directions and relative positions, including "center", "lateral direction", "longitudinal direction", "length", "width", "thickness", "above", "below", "front", "back", "left", "right", "vertical", "horizontal", "top", "bottom", "inner", "outer", "clockwise", "anti-clockwise", and the like are all based on directions and relative positions shown in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure. In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the present disclosure, a plurality may indicate two or more, unless specified otherwise.

In the present disclosure, it should be noted, unless specified or limited, otherwise, terms "install", "connected", "coupled", "disposed", and the like, are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present disclosure, unless specified or limited otherwise, a structure in which a first feature is "on" or "below" a second feature may encompass an embodiment in which the first feature is in a direct contact with the second feature, and may also encompass an embodiment in which the first feature and the second feature are not in a direct contact, but are contacted via an additional feature provided therebetween. Furthermore, expressions such as "a first feature is "on," "above," or "on top of a second feature" may encompass an embodiment in which the first feature is right or obliquely "on," "above," or "on top of the second feature, or just that the first feature is at a height higher than that of the second feature; while expressions such as "a first feature "below," "under," or "on bottom of a second feature" may encompass an embodiment in which the first feature is right or obliquely "below," "under," or "on bottom of" the second feature, or just that the first feature is at a height lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, a person skilled in the art may be aware of applications of other processes and/or other materials.

According to an aspect of the present disclosure, an electronic apparatus may be provided. The electronic apparatus may include a processor, a gyro, and an imaging module arranged on a mainboard of the electronic apparatus and separated from the gyro and the processor. The imaging module may include a shell defining a light incident hole; a light reflection element, a mounting base, an image sensor and a driving device arranged in the shell. The light reflection element may be fixed on the mounting base and configured to reflect light incident from the light incident hole to the image sensor, such that the image sensor senses the incident light outside of the imaging module. The processor may be configured to control the driving device to drive the mounting base with the light reflection element to rotate around a rotation axis based on feedback data sent from the gyro, such that optical image stabilization along a light axis of the light incident hole is achieved, and the rotation axis is perpendicular to the light axis of the light incident hole.

In another embodiment, the electronic apparatus may include a processor, a gyro, and an imaging module arranged on a mainboard of the electronic apparatus and separated from the gyro and the processor. The imaging module may include a shell defining a light incident hole; and a light reflection element, a mounting base, an image sensor and a driving device arranged in the shell. The light reflection element may be fixed on the mounting base and configured to reflect light incident from the light incident hole to the image sensor, such that the image sensor senses the incident light outside of the imaging module. The processor may be configured to control the driving device to drive the mounting base with the light reflection element to rotate around a rotation axis based on feedback data sent from the gyro, such that optical image stabilization along an axial direction of the light incident hole is achieved, and the rotation axis is perpendicular to the axial direction of the light incident hole.

In an embodiment, the processor may be configured to control the driving device to drive the mounting base to move along an extending direction of the rotation axis based on the feedback data sent from the gyro. The rotation axis may be perpendicular to the light axis of the light incident hole and a photosensitive direction of the image sensor, such that optical image stabilization is achieved along the direction of the rotation axis.

In another embodiment, the processor may be configured to control the driving device to drive the mounting base to move along an extending direction of the rotation axis based on the feedback data sent from the gyro. The rotation axis and the axial direction of the light incident hole may be perpendicular to a photosensitive direction of the image sensor, such that optical image stabilization is achieved along the extending direction of the rotation axis.

In further another embodiment, the driving device may define a curved track, the processor may be configured to control the driving device to drive the mounting base to rotate along the curved track and around a central axis of the curved track, or move along an extending direction of the central axis. The central axis may coincide with the rotation axis.

In still another embodiment, the mounting base may include a curved face concentric with and fitting with the curved track.

In an embodiment, the driving device may be arranged at a bottom of the shell.

In another embodiment, the driving device may be adapted to drive the mounting base to rotate by electromagnetism or piezoelectricity.

In further another embodiment, the light reflection element may include a light incident face arranged close to and toward the light incident hole; a backlight face arranged away from the light incident hole and opposite to the light incident face; a light reflection face connecting the light incident face and the backlight face and being inclined relative to the light incident face; and a light exit face connecting the light incident face with the backlight face and opposite to the light incident face.

In still another embodiment, the light reflection element may include a light incident face arranged close to and toward the light incident hole; a light reflection face connecting connected to the light incident face and the backlight face and inclined relative to the light incident face; and a light exit face connecting the light incident face; the incident light may enter to the light incident element from the light incident face, and be reflected by the reflection face to change direction and emitted from the light exit face.

In an embodiment, the light incident face may be parallel to the backlight face.

In another embodiment, the axial direction of the light incident hole may be perpendicular to the light incident face.

In further another embodiment, the imaging module may include an action element arranged on a side of the image sensor, or between the light reflection element and the image sensor, and inside the shell; a lens assembly fixed on the action element; and a driving mechanism connected to the shell and the action element. The processor may be configured to control the driving mechanism to drive the action element to move along a light axis of the lens assembly, such that images are focused and formed by the lens assembly on the image sensor.

In still another embodiment, the action element may have a configuration of tubular, the lens assembly may include a plurality of lenses fixed in the action element along an axis direction of the action element and spaced apart from each other.

In an embodiment, the action element may include two clamping pieces, the lens assembly may be sandwiched between the two clamping pieces.

In another embodiment, the electronic apparatus may further include a decoration component arranged on the imaging module and surrounding a periphery of the light incident hole.

In further another embodiment, the shell may define a groove on a side of the light incident hole along a width direction of the imaging module, a part of the decoration component may be embedded into the groove. The decoration component may define a through hole, the light incident hole may be exposed to the outside through the through hole, and the imaging module may be configured to collect external images through the through hole.

In still another embodiment, the shell may include a top wall and a side wall extending from a side edge of the top wall, the light incident hole may be defined on the top wall, the groove may be defined at the connected position of the top wall and the side wall, and the decoration component may be configured to abut against the top wall.

In further still another embodiment, the number of the side wall may be two, the top wall may include two side edges opposite to each other, each of the side walls may extend from a corresponding side edge; the number of the groove may be two, and connected positions of each of the side walls and the top wall may define the grooves.

In an embodiment, the shell may include a wall and a side wall connected to a side edge of the top wall. The light incident hole may be defined in the top wall. The top wall may further define a groove on a side of the light incident hole, a part of the decoration component may be embedded into the groove. The decoration component may define a through hole, the light incident hole may be exposed to the outside through the through hole, and the imaging module may be configured to collect external images through the through hole.

In another embodiment, the groove may be defined at the connected position of the top wall and the side wall, and the decoration component may be configured to abut against the top wall.

In further another embodiment, the number of the side wall may be two, the side walls may be opposite to each other; the number of the groove may be two, and the groves may be opposite to each other.

According to another aspect of the present disclosure, an electronic apparatus may be provided. The electronic apparatus may include a housing, an imaging module received in the housing, a gyro fixed in the housing and out of the imaging module, and a processor fixed in the housing and out of the imaging module. The imaging module may include a shell, a light diverting member and a imaging element. The shell may define a light incident hole. The light diverting member may be received in the shell, rotatably connected to the shell, and configured to divert the light. The imaging element may be received in the shell and configured to receive the diverted light and image. The gyro may be configured to detect shake of the electronic apparatus to obtain shaking data. The processor may be configured to control light diverting member to rotate based on the shaking data sent from the gyro. The rotation axis may be perpendicular to an axial direction of the light incident hole, and both the rotation axis and the axial direction of the light incident hole may be perpendicular to the photosensitive direction of the image.

In an embodiment, the processor may be configured to control the light diverting member to move along an extending direction of the rotation axis based on the shaking data sent from the gyro.

According to further another aspect of the present disclosure, a mobile terminal may be provided. The mobile terminal may include a housing and a mainboard, a processor, a gyro, and an imaging module received in the housing. The processor, the gyro, and the imaging module may be arranged on the mainboard and separated from each other. The gyro may be configured to detect an action of the mobile terminal to obtain action data. The imaging module may include a shell defining a light incident hole; and a light reflection element, a mounting base, an image sensor and a driving device arranged in the shell. The light reflection element may be fixed on the mounting base and configured to reflect light incident from the light incident hole to the image sensor. The mounting base may be rotatably connected to the shell and configured to rotate around a rotation axis. The image sensor may have a photosensitive direction and be configured to sense incident light outside of the imaging module. The driving device may be configured to drive the mounting base to rotate. The processor may be configured to control the driving device to drive the mounting base to rotate around a rotation axis based on the action data sent from the gyro, such that the light reflection element rotates with the mounting base. The rotation axis may be perpendicular to an axial direction of the light incident hole, and both the rotation axis and the axial direction of the light incident hole may be perpendicular to the photosensitive direction of the image.

Figure 2:
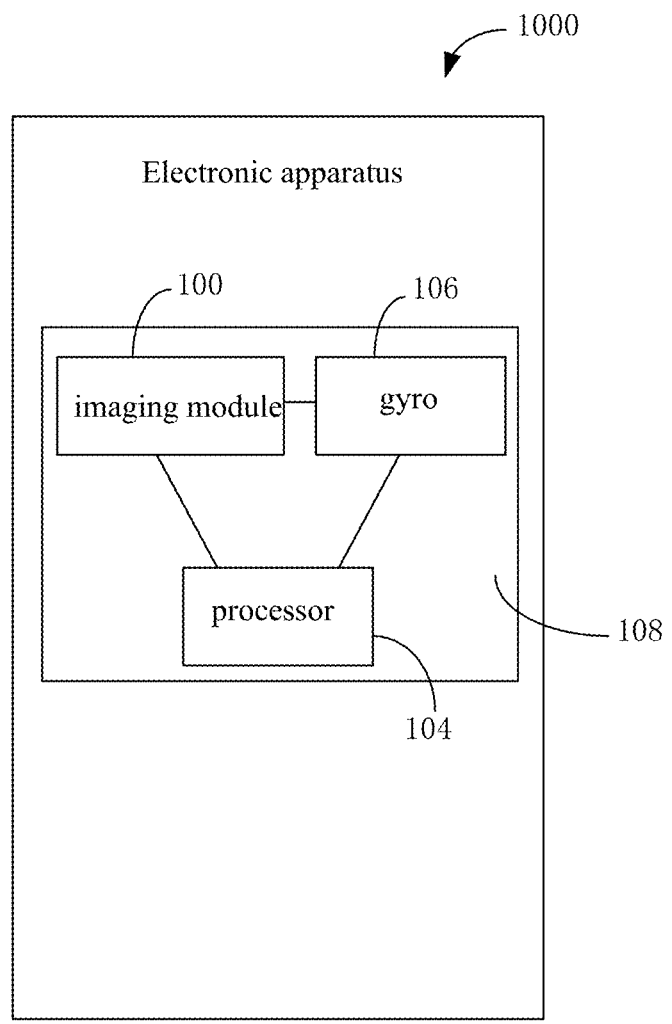
FIG. 2 is a schematic view of a module of the electronic apparatus according to an embodiment of the present disclosure.
Figure 3:
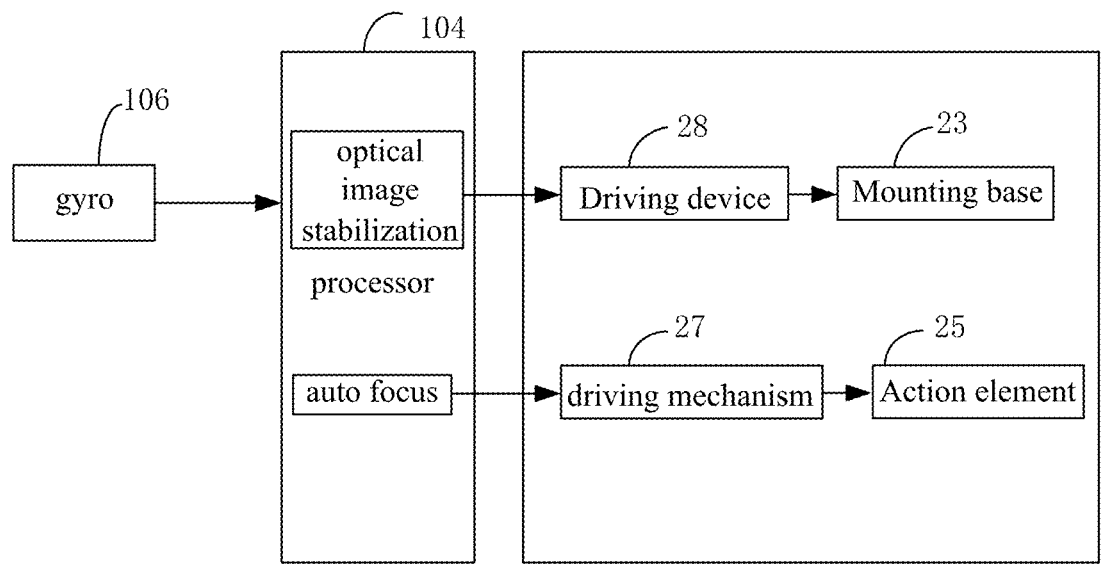
FIG. 3 is a schematic view of control pattern of the electronic apparatus according to an embodiment of the present disclosure.

Referring to FIG. 1 to FIG. 3, an electronic apparatus 1000 may include a housing 102 and a camera assembly 100. The camera assembly 100 may be arranged on the housing 102. The electronic apparatus 1000 may be a mobile phone, a tablet computer, a notebook computer, an intelligent bracelet, an intelligent watch, an intelligent helmet, intelligent glasses, and the like. Embodiments of the present disclosure may take a mobile phone as the electronic apparatus 1000 as an example. The electronic apparatus 1000 may be in other forms, and should be limited herein.

To be specific, the housing 102 may be an external component of the electronic apparatus 1000 and protect internal components of the electronic apparatus 1000. The housing 102 may be a back shell of the electronic apparatus 1000 and cover a battery and other components of the electronic apparatus 1000. In the present implementation, a camera assembly 100 may be a rear camera assembly, meaning that the camera assembly 100 may be arranged at the rear face of the electronic apparatus 1000 so that the device 1000 can take photos and videos from the rear face. Referring to FIG. 1, the camera assembly 100 may be arranged at a top left corner of the housing 102. It should be understood that the camera assembly 100 may also be arranged at a top center position, a top right position or other positions of the housing 102. The present disclosure does not limit the position of the camera assembly 100 on the housing 102.

Figure 4:
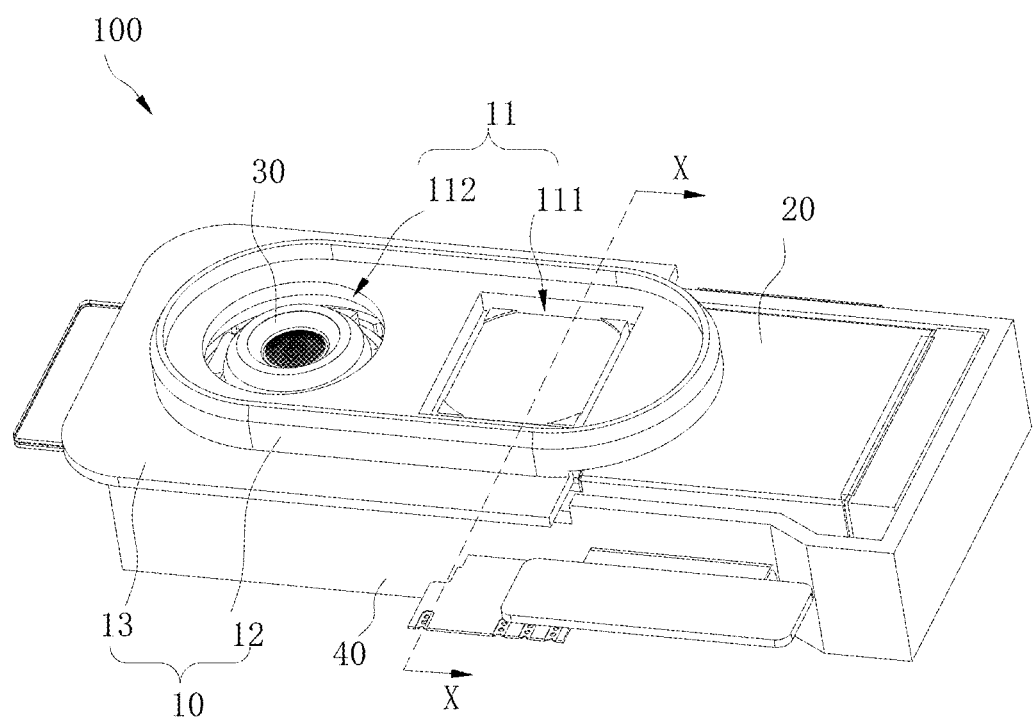
FIG. 4 is a perspective view of a camera assembly according to an embodiment of the present disclosure.
Figure 5:
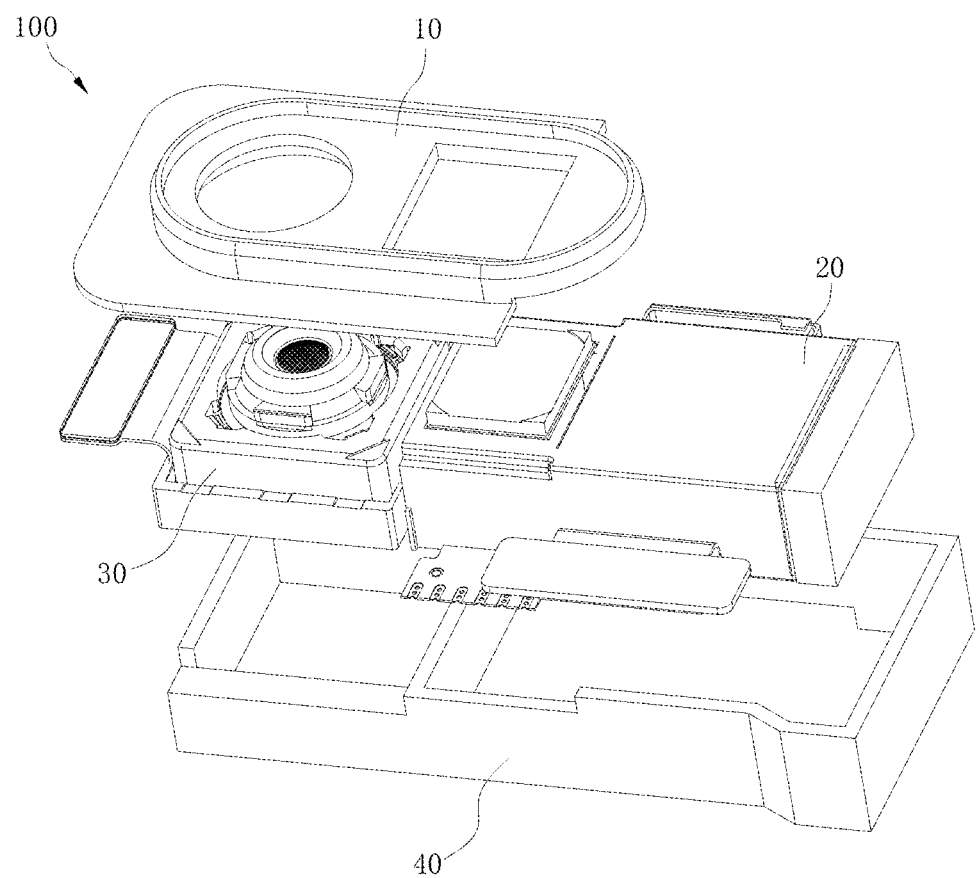
FIG. 5 is an exploded isometric view of a camera assembly according to an embodiment of the present disclosure.

Referring to FIG. 4 and FIG. 5, the camera assembly 100 may include a decoration component 10, a first imaging module 20, a second imaging module 30 and a rack 40. The decoration component 10 may be arranged on the housing 102 and protrude out of the face of the housing 102. The first imaging module 20 and the second imaging module 30 may be arranged inside the housing 102. The first imaging module 20 and the second imaging module 30 may be close to the decoration component 10. The first imaging module 20 and the second imaging module 30 may be located inside the rack 40 and fixedly connected with the rack 40.

The decoration component 10 may be arranged on top of the rack 40, to be specific, the decoration component 10 may abut against the rack 40 or be separated from the rack 40. The rack 40 may reduce impacts happened to the first imaging module 20 and the second imaging module 30, which may increase service life of the first imaging module 20 and the second imaging module 30.

The decoration component 10 may be made of metal materials. For example, when the decoration component 10 is made of stainless steel, the decoration component 10 may be treated with a polishing process to form a bright face, so that the decoration component may get an artistic appearance.

Figure 6:
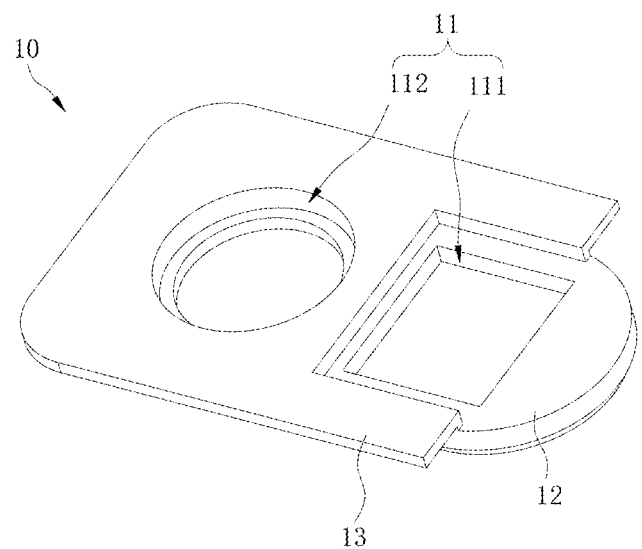
FIG. 6 is a perspective view of a decoration component according to an embodiment of the present disclosure.

Referring to FIG. 6, the decoration component 10 may define a through hole 11, the first imaging module 20 and the second imaging module 30 may be exposed to the outside of the decoration component 10 through the through hole 11. In other words, the first imaging module 20 and the second imaging module 30 collect external images through the through hole 11. To be specific, in the present embodiment, the through hole 11 may include a first sub-hole 111 and a second sub-hole 112, wherein the first sub-hole 111 and the second sub-hole 112 may be spaced apart from each other. In other words, the first sub-hole 111 and the second sub-hole 112 may not communicate with each other.

In other embodiments, the first sub-hole 111 and the second sub-hole 112 may communicate and form a uniform hole. The first imaging module 20 may collect external images through the first sub-hole 111, and the second imaging module 30 may collect external images through the second sub-hole 112. In the present embodiment, the first sub-hole 111 may be a square hole, and the second sub-hole 112 may be a circular hole.

In other embodiments, the shapes of the first sub-hole 111 and the second sub-hole 112 may not be limited by the shapes illustrated in the figures. For example, the first sub-hole 111 and the second sub-hole 112 may both be circular; or the first sub-hole 111 and the second sub-hole 112 may both be square.

Figure 13:
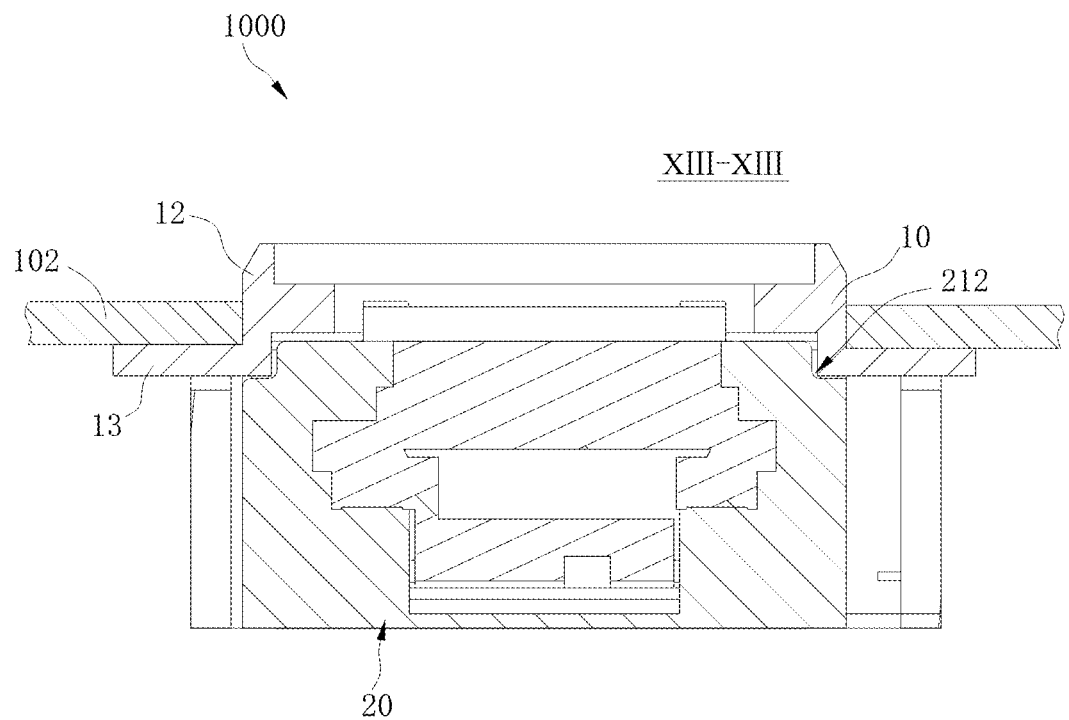
FIG. 13 is a sectional view of the electronic apparatus shown in FIG. 1 along XIII-XIII direction.
Figure 14:
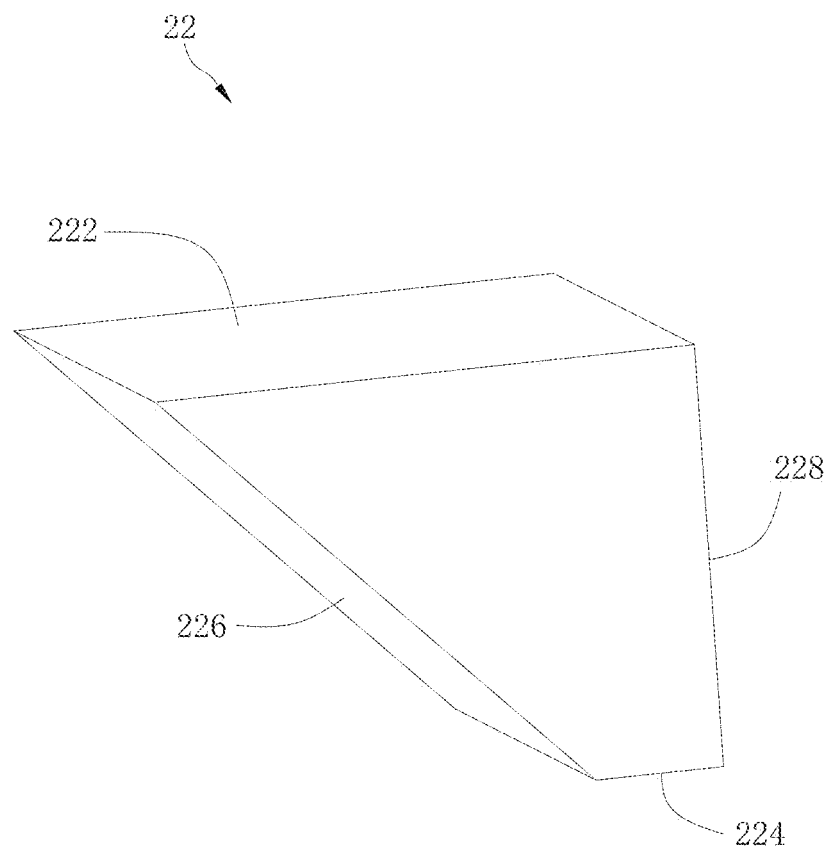
FIG. 14 is a perspective view of a light reflection element according to an embodiment of the present disclosure.

The decoration component 10 may include a decoration ring 12 and a protruded portion 13. The through hole 11 may be defined in the decoration ring 12 and cross through the decoration ring 12. The protruded portion 13 may extend from a bottom of the decoration ring 12 and elongate away from the through hole 11. The decoration ring 12 may be arranged on the housing 102, and the protruded portion 13 may abut against the housing 102, as shown in FIG. 13. In such a way, the protruded portion 13 may limit the position of the decoration component 10, so that the decoration component 10 may be prevented from moving to the outside of the housing 102.

In an embodiment, the decoration component 10 may be configured by being plugged in from an inner side to an outer side of the housing 102 and may reach the desired position when the protruded portion 13 abuts against the inner face of the housing 102. The decoration component 10 may be connected to the housing 102 by glue-adhesion or interference fit, which may prevent the decoration component 10 from detaching from the housing 102.

The decoration component 10 may be an integral structure formed by the decoration ring 12 and the protruding side 13, for example the decoration component 10 may be manufactured by a cutting process. Further, the decoration ring 12 and the protruding side 13 may be separate structures, in other words, the decoration ring 12 and the protruding side 13 may form two independent components, and processed by welding or other treatments to be assembled to form the decoration component 10.

It should be noted that, in other embodiments, the protruded portion 13 may be omitted, that is, in these embodiments, the decoration component 10 may include the decoration ring 12 only.

The first imaging module 20 and the second imaging module 30 may be juxtaposed, which means the second imaging module 30 may be arranged on a side of the first imaging module 20. In the present embodiment, the first imaging module 20 and the second imaging module 30 may be arranged on one straight line. In other embodiments, the first imaging module 20 and the second imaging module 30 may be arranged into an "L" shape. The first imaging module 20 and the second imaging module 30 may be configured to be located separately or abut against each other.

In the present embodiment, as shown in FIG. 1 and FIG. 4, the first imaging module 20 may be located on the right side of the second imaging module 30, which means, compared with the second imaging module 30, the first imaging module 20 may be closer to the central position of the electronic apparatus 1000. It should be understood that, in other embodiments, the position of the first imaging module 20 and the second imaging module 30 may be interchanged, that is, the first imaging module 20 may be located on the left side of the second module 30.

One of the first imaging module 20 and the second imaging module 30 may be a black-and-white camera, and the other imaging module may be a color (RGB) camera; or one of the first imaging module 20 and the second imaging module 30 may be an infrared camera, and the other imaging module may be an RGB camera; or one of the first imaging module 20 and the second imaging module 30 may be an RGB camera, and other imaging module may also be an RGB camera; or one of the first imaging module 20 and the second imaging module 30 may be a wide-angle camera, and the other imaging module may be a tele-lens camera; or the like.

In other embodiments, the second imaging module 30 may be omitted, or the electronic apparatus 1000 may include more than three imaging modules.

Current methods for optical image stabilization in the related art may require an independent camera gyro arranged in the imaging module for detecting shaking of the camera and the imaging module may, and further require a printed circuit boards (PCB) configured with driving ICs arranged in the imaging module. In such a way, the size of the imaging module with the optical image stabilization function may be greater than that of a normal imaging module and may not be reduced.

As shown in FIG. 2, in the present embodiment, the electronic apparatus 1000 may include a processor 104 and a gyro 106. The processor 104, the gyro 106, and the camera assembly 100 are independently configured on a mainboard 108 of the electronic apparatus 1000. The processor 104 may be a central processing unit of the electronic apparatus 1000, which may receive input from the relative sensors and input elements, and then provide output to control operations of the relative elements.

As a typical sensor, the gyro 106 may be applied to detect linear actions of the electronic apparatus 1000 along an axis direction, measuring movements of rotation and deflection. For example, the gyro 106 may detect vertical or horizontal status of the electronic apparatus 1000, and the processor 104 may control the images to rotate based on the obtained detected data.

In the present embodiment, during imaging, the gyro 106 of the electronic apparatus 1000 may be used to detect micro shaking generated by the camera assembly 100, and then send the detected shaking data, such as a tilt angle resulted from the shaking of the camera assembly 100 and shifting resulted from the tilt, to the processor 104 of the electronic apparatus 1000. Based on the feedback data received from the gyro 106, the processor 104 may control the assemblies within the imaging module to move relative to the camera assembly 100 to achieve the optical image stabilization, which means the control of optical image stabilization may be performed by the processor 104 of the electronic apparatus 1000, instead of an independent driving IC. It should be understood that, the processor 104 and the gyro 106 of the electronic apparatus 1000 may both be arranged at positions out of the camera assembly 100, which may save space of camera assembly 100 occupied by an independent gyro and driving IC in the camera assembly 100. In such a way, the camera assembly 100 may be of similar size with a normal camera, use the processor 104 and gyro 106 of the electronic apparatus 1000 to achieve optical image stabilization, and, at the same time, effectively reduce the size of the camera assembly 100.

Figure 7:
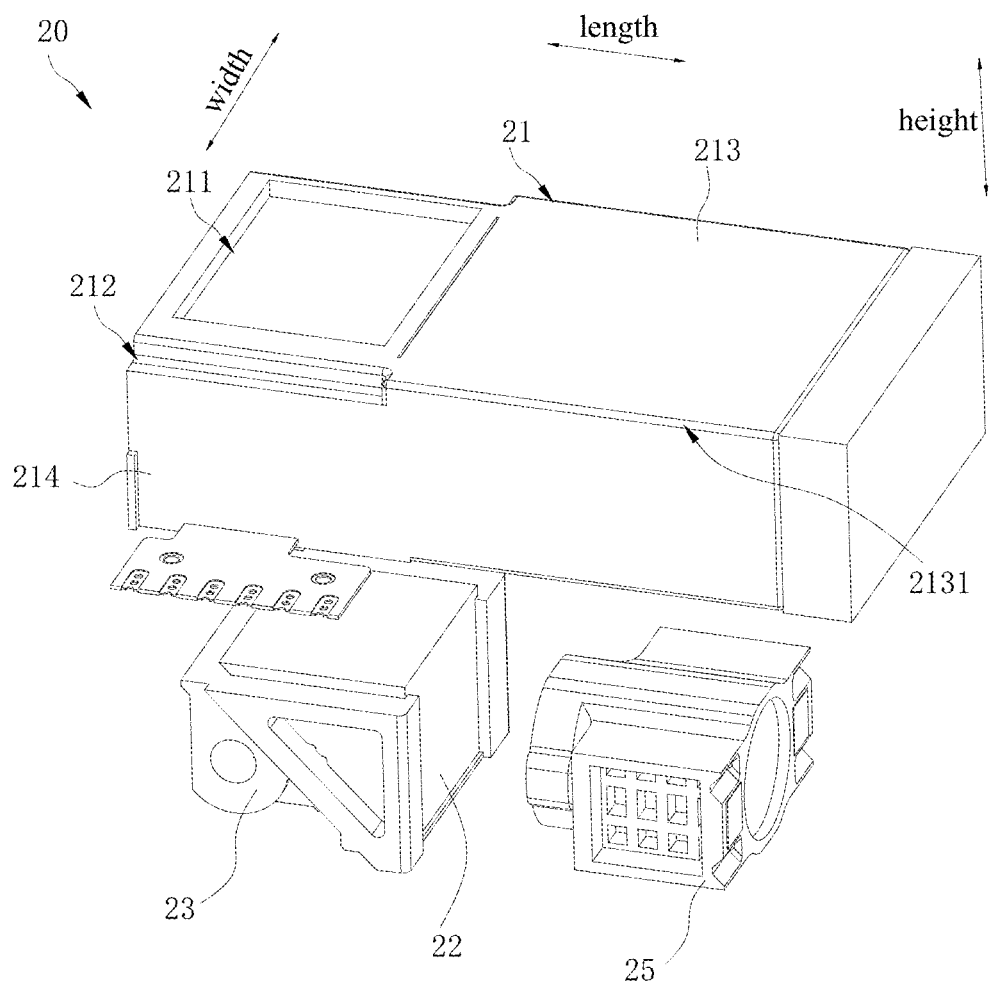
FIG. 7 is an exploded isometric view of a first imaging module according to an embodiment of the present disclosure.
Figure 8:
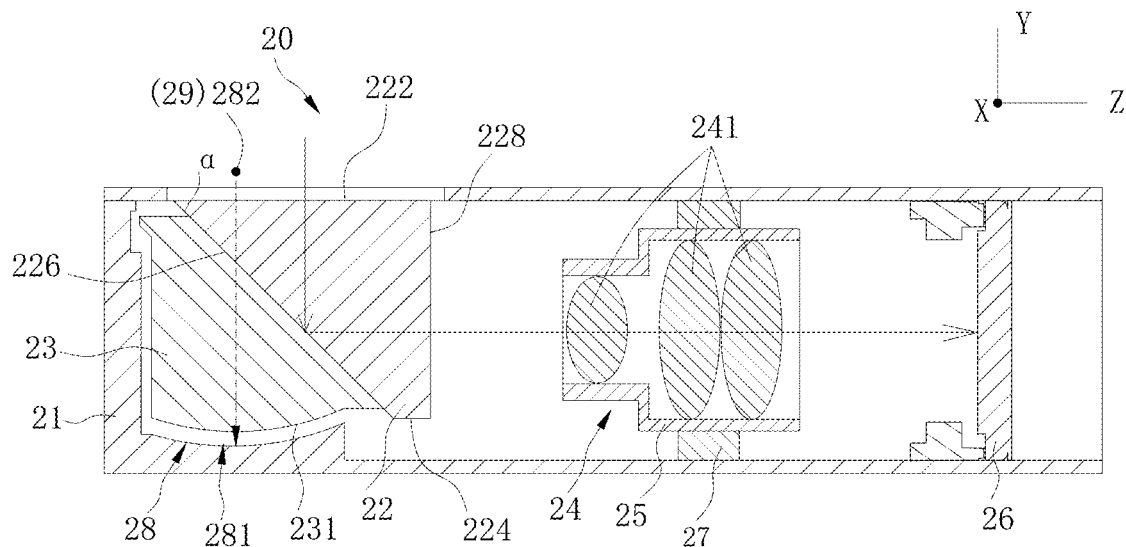
FIG. 8 is a sectional view of a first imaging module according to an embodiment of the present disclosure.
Figure 9:
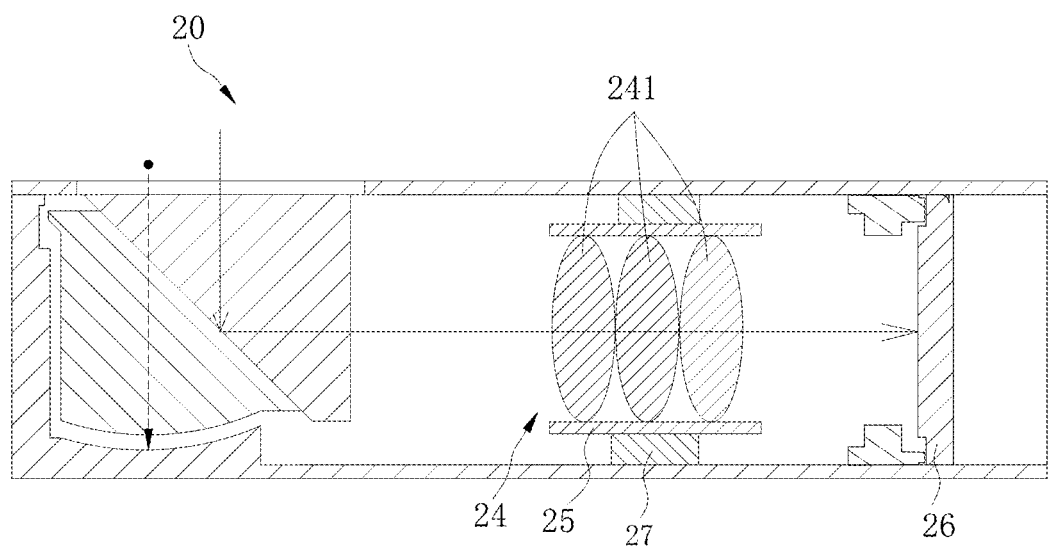
FIG. 9 is a sectional view of a first imaging module according to another embodiment of the present disclosure.

Referring to FIG. 7 to FIG. 9, in an embodiment of the present disclosure, the first imaging module 20 may include a shell 21, a light reflection element 22, a mounting base 23, a first lens assembly 24, an action element 25, a first image sensor 26, and a driving mechanism 27.

The light reflection element 22, the mounting base 23, the first lens 24, and the action element 25 may all be arranged inside the shell 21. The light reflection element 22 may be fixed on the mounting base 23, the first lens assembly 24 may be received inside the action element 25, and the driving mechanism 27 may connect the action element 25 to the shell 21. Incident light enters the shell 21, then may be reflected by the light reflection element 22, and then transmitted through the first lens assembly 24 to reach the first image sensor 26, so that the first image sensor 26 may obtain an external image. The processor 104 may control the driving mechanism 27 to drive the action element 25 to move. The action element 25 may further drive the first lens assembly 24 to move along a light axis of the lens assembly 24, so that the first imaging module 20 may focus.

The shell 21 may have a configuration of square and define a light incident hole 211, which may allow incident light to enter into the first imaging module 20. In other words, the light reflection element 22 may change the direction of the incident light entering from the light incident hole 211, to reach the image sensor 26. Therefore, it may be understood that, the first imaging module 20 may be a periscope type camera assembly and have a smaller height compared with a vertical camera, which may reduce the general thickness of the electronic apparatus 1000. The vertical camera assembly indicates the light axis of the lens assembly is a straight line, or the incident light transmits to reach the light sensor along a straight axis.

It may be understood that, the light incident hole 211 may be exposed through the through hole 11 to allow external light to pass through the through hole 11 and enter the first imaging module 20.

Figure 10:
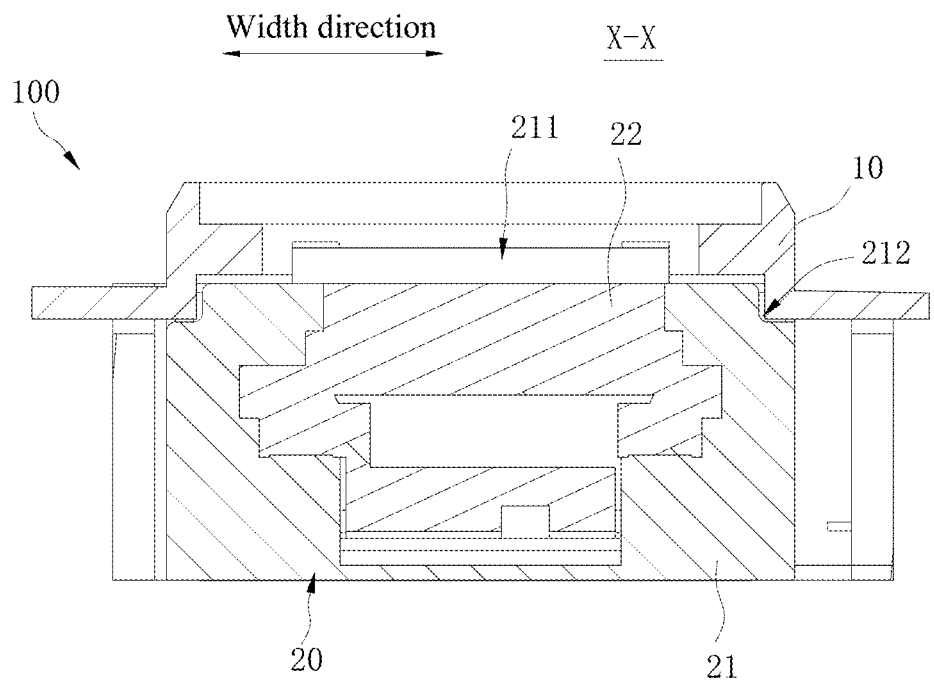
FIG. 10 is a sectional view along X-X direction of the camera module shown in FIG. 4.

Referring to the embodiment in FIG. 10, along the width direction of the first imaging module 20, the shell 21 may define a groove 212 on a side of the light incident hole 211, and the decoration component 10 may be arranged on the first imaging module 20 and surrounding a periphery of the light incident hole 211; A part of the decoration component 10 may be embedded into the groove 212.

Figure 12:
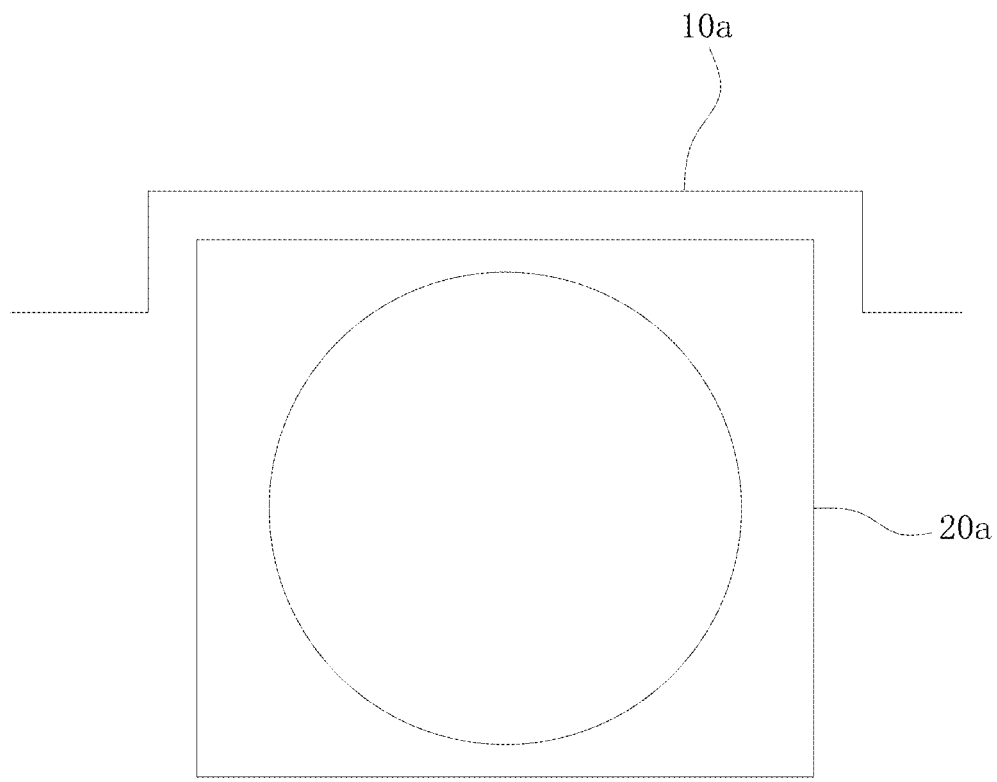
FIG. 12 illustrates configuration of an imaging module and a decoration component according to an embodiment of the present disclosure.

Referring to the FIG. 12, when the groove is omitted, in order to make the electronic apparatus with a small thickness, a part periscope type imaging module 20a along the width direction may be embedded into the decoration component 10a. As the thickness of the periscope type imaging module 20a is greater than that of a vertical imaging module, the decoration component 10a may be in a large size, which may impact the appearance of the electronic apparatus and result in an incompact structure of the electronic apparatus.

Referring to FIG. 7 to FIG. 10, in the embodiment, the groove 212 may be defined on the side of the light incident hole 211, and the decoration component 10 may surround a periphery of the light incident hole 211, and structure part of the decoration component 10 may be embedded into the groove 212, which may reduce the width of the decoration component 10 and the height of the entire camera module 100, resulting in a compact structured and smaller sized camera assembly 100.

To be specific, the shell 21 may include a top wall 213 and a side wall 214. The side wall 214 may be connected to a side edge 2131 of the top wall 213. The top wall 213 may include two side edges 2131 opposite to each other, the number of the side walls 214 may be two, and each of the two side walls 214 may be connected to a corresponding side edge 2131, which means the two side walls 214 may oppositely connect to the two sides of the top wall 213. The light incident hole 211 may be defined on the top wall 213, the groove 212 may be defined at the connected position between the top wall 213 and the side walls 214, and the decoration component 10 may abut against the top wall 213. In such a way, the groove 212 may be easily formed, and the shell 21 may be easily manufactured. In an embodiment, the groove 212 may be a compressed pattern of the shell 21, which means the groove 212 may be defined by a compressing process.

In an embodiment, a part of the bottom of the decoration ring 12 may be embedded into the groove 212, and a part of the decoration ring 12 may abut against the top wall 213, which means the decoration ring 12 and the shell 21 form a complementary structure, the decoration ring 12 and the shell 21 may tightly fit with each other, resulting in a compact incorporation between the decoration component 10 and the shell 21.

In the present embodiment, each of the connected positions between a side wall 214 and the top wall 213 may define a groove 212, meaning the number of the grooves 212 may be two. In other embodiments, the number of the groove 212 may be one, meaning only one of the connected positions between one side wall 214 and the top wall 213 may define a groove 212.

In the present embodiment, the groove 212 may be rod shaped and extend along the length direction of the first imaging module 20. In such a way, the decoration component 10 may be more tightly configured to the shell 21. In other embodiments, the groove 212 may be curve shaped and surround the light incident hole 211, so that the decoration component 10 and the first imaging module 20 can form a complementary structure to reduce the size of the decoration component 10.

The light reflection element 22 may be a prism or a plane mirror. In an embodiment, when the light reflection element 22 is a prism, the prism may be triangular, and the cross section of the triangular prism may be a right-angled triangle. The light may incident from one side of the right angle, reflected by the hypotenuse, emitting out from the other side of the right angle. It may be understood that, the incident light may be refracted, but not reflected, by the prism to emit. The prism may be made of glass, plastics and other materials with high light transmission. In an embodiment, one side of the prism may be painted with silver and other light reflecting materials to reflect the incident light.

It may be understood that, when the light reflection element 22 is a plane mirror, the incident light may be reflected by the plane mirror to change the direction of the light path.

Further, referring to FIG. 8 to FIG. 14, the light reflection element 22 may include a light incident face 222 arranged close to and toward the light incident hole 211, a backlight face 224 arranged away from the light incident hole 211 and oppositely to the light incident face 222, a light reflection face 226 connecting the light incident face 222 to the backlight face 224, and a light exit face 228 connecting the light incident face 222 and the backlight face 224. The light reflection face 226 may be configured to be inclined relative to the light incident face 222.

In particular, during the process of changing the light path, the light may pass through the light incident hole 211 and enter the light reflection element 22 via the light incident face 222, and then may be reflected by the light reflection face 226, and eventually may be emitted from the light reflection element 22 through the light exit face 228, in such a way, the change of the light path may be finished. The backlight face 224 may be fixed on the mounting base 23, so that the light reflection element 22 may remain stable.

Figure 15:
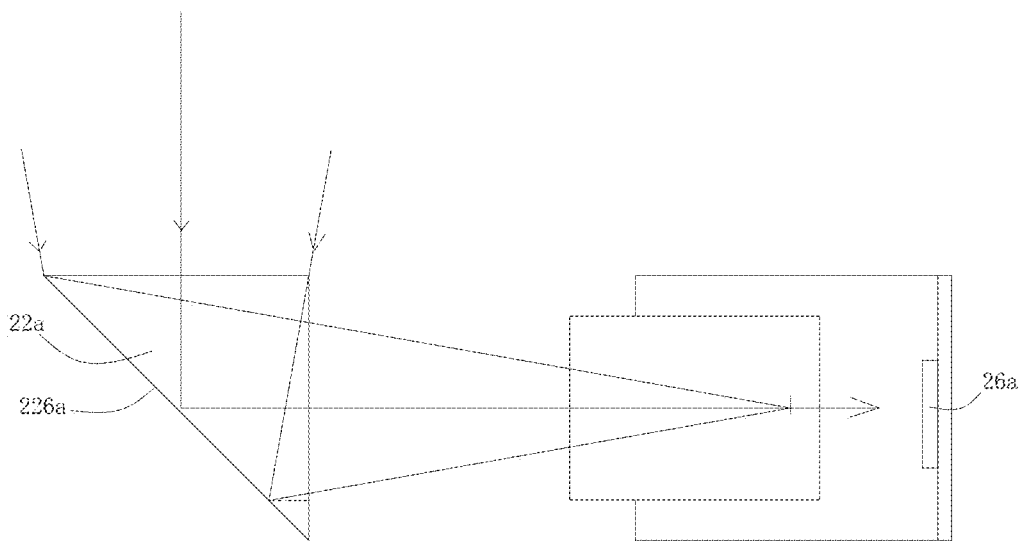
FIG. 15 illustrates light reflective imaging of the first imaging module in the related art.

Referring to FIG. 15, in the related art, due to the requirement of reflecting the incident light, the light reflection face 226a of the light reflection element 22a is inclined relative to the horizontal direction, and the light reflection element 22a is asymmetrical along the direction of light reflection. Therefore, the actual optical area of the lower part of the light reflection element 22a may be smaller than that of the upper part of the light reflection element 22a, meaning that partial face of the light reflection face 226a away from the light incident hole may have a smaller area for light reflection or may not be able to reflect any light.

Figure 16:
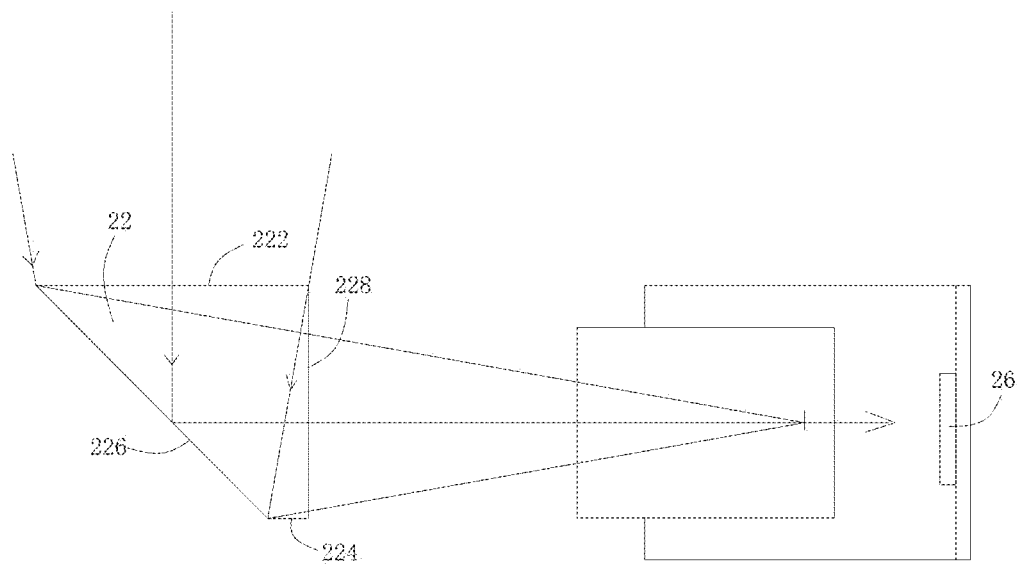
FIG. 16 illustrates light reflective imaging of a first imaging module according to an embodiment of the present disclosure.

Therefore, referring to FIG. 16, compared with the related art, an embodiment of the present disclosure may provide a light reflection element 22, a corner angle away from the light incident hole may be cut. In such a way, the light reflection effect of the light reflection element 22 may not be impacted, and the thickness of the entire light reflection element 22 may be reduced.

In some embodiments, the light reflection face 226 may be inclined relative to the light incident face 222, an angle α between the light reflection face 226 and the light incident face 222 may be 45°.

In such a way, the light reflection element may achieve a better effect on light reflection and transmission.

The light reflection element 22 may be made of glass, plastics, and other materials with high light transmission. In an embodiment, one face of the light reflection element 22 may be painted with silver and other light reflecting materials to reflect the incident light.

In some embodiments, the light incident face 222 may be parallel to the backlight face 224.

In such a way, when the backlight face 224 is fixed on the mounting base 23, the light reflection element 22 may remain stable. The light incident face 222 may be a plane, the incident light may follow a regular light path during the transmission in the light reflection element 22, which may get high light transmission efficiency. To be specific, along the light incident direction from the light incident hole 221, the cross section of the light reflection element 22 may be roughly a trapezoid, or in other words, the light reflection element 22 may be substantially a trapezoid.

In some other embodiments, the light incident face 222 and the backlight face 224 may both be perpendicular to the light exit face 228.

In such a way, the light reflection element 22 with a relatively regular shape may be obtained, and the incident light may have a relatively straight path, increasing the light transmission efficiency.

In some embodiments, the distance between the light incident face 222 and the backlight face 224 may be in a range of 4.8-5.0 mm.

To be specific, the distance between the light incident face 222 and the backlight face 224 may be 4.85 mm, 4.9 mm, 4.95 mm, or the like. In other words, the distance between the light incident face 222 and the backlight face 224 may indicate the height of the light reflection element 22, which may be in the range of 4.8-5.0 mm. When the distance is within the range above mentioned, the light reflection element 22 including the light incident face 222 and the backlight face 224 may define a moderate sized cavity, which may be fit into the first imaging module 20 appropriately. Therefore, the first imaging module 20, the camera assembly 100 and the electronic apparatus could form a more compact and minimized structure, meeting more of customers' demand.

In some embodiments, the light incident face 222, the backlight face 224, the light reflection face 226, and the light exit face 228 may all be hardened to form a hardened layer.

When the light reflection element 22 is made of glass or the like, the light reflection element 22 may be soft and fragile. In order to increase the intensity of the light reflection element 22, a hardening process may be performed to the light incident face 222, the backlight face 224, the light reflection face 226, and the light exit face 228. Furthermore, the hardening process may be performed to all the faces of the light reflection element to further increase the intensity of the light reflection element. Under the condition of not impacting light transmission, the hardening process, such as penetration of Lithium ions, may attach a film to each face of the light reflection element 22.

In an embodiment, the direction of the incident light entering from the light incident hole 211 may be changed by the light reflection element 22 by 90°. For example, an incident angle of the incident light on the light reflection face of the light reflection element 22 may be 45°, and the reflection angle may also be 45°. The light reflection element 22 may change the light transmission direction by other degrees, such as 80°, 100°, or the like, as long as the incident light can be reflected to reach the first imaging sensor 26.

In the present embodiment, the number of the light reflection elements 22 may be one, in this case, the incident light may be reflected once to reach the first imaging sensor 26. In other embodiments, the light reflection element 22 may be of plurality, in such a way, the incident light may be reflected at least twice to reach the first imaging sensor 26.

The mounting base 23 may be configured to support the light reflection element 22, in other words, the mounting base 23 may be a supporter of the light reflection element 22. The light reflection element 22 may be fixed on the mounting base 23, which allows the position of the light reflection element 22 to be fixed, and may be beneficial for the light reflection element 22 to reflect or refract incident light. The light reflection element 22 may be fixed on the mounting base 23 by glue adhesion.

Referring to FIG. 8 once more, in an embodiment, the mounting base 23 may be connected to the shell 21 in a flexible manner, and capable of rotating relative to the shell 21 so as to adjust light direction reflected by the light reflection element 22.

The mounting base 23 may drive the light reflection element 22 to rotate reversely relative to the shaking direction of the first imaging module 20, so that the incident deviation of the incident light entering from the light incident hole 211 may be compensated, thereby achieving the effect of optical image stabilization. The mounting base 23 may be connected to a driving device 28. Based on the feedback data sent from the gyro 106, the processor 104 may control a driving device 28 to drive the mounting base 23 to rotate.

The first lens assembly 24 may be received inside the action element 25. The first lens assembly 24 may be arranged between the light reflection element 22 and the first image sensor 26. The first lens assembly 24 may be applied to form images on the first image sensor 26. In such a way, the first image sensor 26 may obtain high quality images.

When the entire first lens assembly 24 moves along the light axis thereof, images may be formed on the first image sensor 26, so that the first imaging module 20 may focus. The first lens assembly 24 may include a plurality of lens 241, and when at least one of the lenses 241 moves, the entire focus of the first lens assembly 24 may be changed, so that the first imaging module 20 may achieve the function of changing focal length. The variable focal length may be further achieved by movement of the action element 25 on the shell 21, which is driven by driving mechanism 27 controlled by the processor 104.

Referring to FIG. 8, in some embodiments, the action element 25 may be tubular. The plurality of lens 241 may be fixed in the action element 25 along the axis direction of the action element 25 and spaced apart from each other. In another embodiment shown in FIG. 9, the action element 25 may include two clamping pieces 252, the lens assembly 24 may be sandwiched between the two clamping pieces 252.

It may be understood that, since a plurality of lenses 241 are fixed in the action element 25 and space apart from each other, the length of the action element 25 may be required to be large. The action element 25 may be a circular or squared tube defining a certain cavity, therefore, the tubular structure may allow the action element 25 to effectively receive and protect a plurality of the lenses 241 within the cavity, so that the lenses 241 may not be shaking easily.

In addition, referring to the FIG. 9, the action element 25 may contain two of the clamping pieces 252 to clamp the plurality of the lenses 241 for stabilization and reducing the weight of the action element 25, as a result, power required for the driving mechanism 27 to drive the action element 25 could be reduced, the difficulty for designing the action element 25 may be lower, and the lenses 241 may be easier to be arranged in the action element 25.

The action element 25 may not be limited to be tubular and contain two of the clamping pieces 252, in other embodiments, the action element 25 may include three, four, or more of the clamping pieces 252 to form a more stable structure, or include one clamping piece 252 to form a more simple structure; or may be a rectangular, a sphere, or other regular or irregular shape, which may define a cavity to house the lenses 241. Options may be made to ensure the imaging module 20 may be imaging and operating normally.

The first image sensor 26 may include a complementary metal oxide semiconductor (CMOS) sensor element or a charge-coupled device (CCD) sensor element.

In some embodiments, the driving mechanism 27 may be an electromagnetic driving mechanism, a piezoelectric driving mechanism, or a memory alloy driving mechanism.

To be specific, the electromagnetic driving mechanism may include a magnetic field and a conductor. When the magnetic field moves with respect to the conductor, an induced current can be generated within the conductor, and an Ampere force may be applied to the conductor resulting movement of the conductor, wherein the conductor may be a component of the electromagnetic driving mechanism, which may drive the action element 25 to move. The piezoelectric driving mechanism may be working based on the inverse piezoelectric effect of piezoelectric ceramic materials. When voltage is applied to the piezoelectric material, mechanical pressure may be generated, which means an interchange between electric energy and mechanical energy may occur, to control mechanical transformation of the element to rotate or move linearly. The advantages of the piezoelectric driving mechanism may include that the facility may have a simple structure and move at a low velocity.

The memory alloy driving mechanism may perform the driving function based on features of a shape memory alloy. The shape memory alloy is a special type of alloys, when the shape memory alloy remembers any shape, even if transformation occurs, heating the shape memory alloy may allow the shape memory alloy to return to the original shape before the transformation, so that the driving action may be achieved. The driving mechanism made of the memory alloy may change the positions fast, and the directions of the position change may be flexible.

The control of the driving mechanism 27 may be the control of focusing and variable focal length, which may be performed in a form of an open loop. During the process of actual photographing, a position of scenery may be fixed with respect to that of the electronic apparatus 1000, focusing may be controlled by the image quality obtained by the image sensor, a closed-loop control of the imaging module along the direction of focusing or changing focal length may not be required. Therefore, the amount of calculation may be reduced effectively, saving the cost. In order to perform a sophisticated control, a closed-loop control may also be established, which is not limited in the present disclosure. With a closed-loop control, feedback of the control may be performed based on the position of the lenses or the lens assembly.

Referring to the FIG. 8, the first imaging module 20 may further include a driving device 28, which may drive the mounting base 23 carrying the light reflection element 22 to rotate around a rotation axis 29 and move along the rotation axis 29. The rotation axis 29 is perpendicular to the axial direction of the light incident hole 211 and a photosensitive direction of the first image sensor 26, so that the first imaging module 20 may achieve the optical image stabilization along the light axis of the light incident 211 and direction of the rotation axis 29.

As the size of the light reflection element 22 may be smaller than that of the lens cone, based on the feedback data from the gyro 106, the processor 104 may control the driving device 28 to drive the mounting base 23 to move along two directions. In such a way, the optical image stabilization of the first imaging module 20 along two directions may be achieved, and the size of the first imaging module 20 may be reduced. The processor 104 and the gyro 106 may have already existed inside the electronic apparatus 1000, therefore, an independent gyro 106 may not be required to be arranged in the imaging module for detecting data of shaking, so that the manufacture cost may be saved, and the size of the imaging module may be reduced. In addition, the processor 104 of the electronic apparatus 1000 may have a high capacity of calculating and processing, the control of image stabilization may not be required to be setup in a separate IC configured in the driving device 28, so that the size of the driving device 28 may be reduced, which may further reduce the size of the imaging module.

Referring to FIG. 7 and FIG. 8, for a clear description, the width direction of the first imaging module 20 is defined as an X direction, the height direction is defined as a Y direction, and the length direction is defined as a Z direction. Therefore, the axial direction of the light incident 211 may be the Y direction, the photosensitive direction of the first image sensor 26 may be the Z direction, and the axis direction of the rotation axis 29 may be the X direction.

The driving device 28 may drive the mounting base 23 to rotate, so that the light reflection element 22 may rotate around the X direction, which may allow the first imaging module 20 to achieve the optical image stabilization along the Y direction. In addition, the processor 104 may control the driving device 28 to drive the mounting base 23 to move along the direction of the rotation axis 29, so that the first imaging module 20 may achieve the optical image stabilization along the X direction. Furthermore, the first lens assembly 24 may move along the Z direction, so that the first lens assembly may focus on the first image sensor 26.

To be specific, when the light reflection element 22 rotates around the X direction, the direction of the light reflected by the light reflection element 22 may move along the Y direction, so that the first image sensor 26 may form various images along the Y direction to achieve the optical image stabilization along the Y direction. When the light reflection element 22 moves along the X direction, the light reflected by the light reflection element 22 may move along the X direction, so that the first image sensor 26 may form various images along the X direction to achieve the optical image stabilization along the X direction.

During actual operation, when controlling the optical image stabilization, with respect to the X and Y directions, holding the electronic apparatus 1000 in hand may have a shaking with a frequency in a range of 3-10 Hz. Therefore, positions of the first imaging module 20 may be obtained frequently for control, at this situation, an open loop control may not meet the requirement of accuracy, and a closed-loop control may be required. In some embodiments, Hall elements may be configured to the mounting base 23, the driving device 28 or the first imaging module 20 for detecting the actual position of the first imaging module 20. Such configuration may be applied to the above-mentioned driving mechanism controlled by a closed loop, which will not be repeatedly described herein.

In some embodiments, the driving device 28 may define a curved track 281, and the processor 104 may control the driving device 28 to drive the mounting base 23 to move along the curved track 281, so as to rotate around the central axis 282 of the curved track 281, or move along the extending direction of the central axis 282, the central axis 2282 may be coincide with the rotation axis 29.

As the driving device 28 may use the curved track 281 to drive the mounting base 23 carrying the light reflection element 22 to rotate, the friction between the driving device 28 and the mounting base 23 may be less, which may allow the mounting base 23 to rotate smoothly, thereby increasing the effect of the optical image stabilization of the first imaging module 20.

Figure 17:
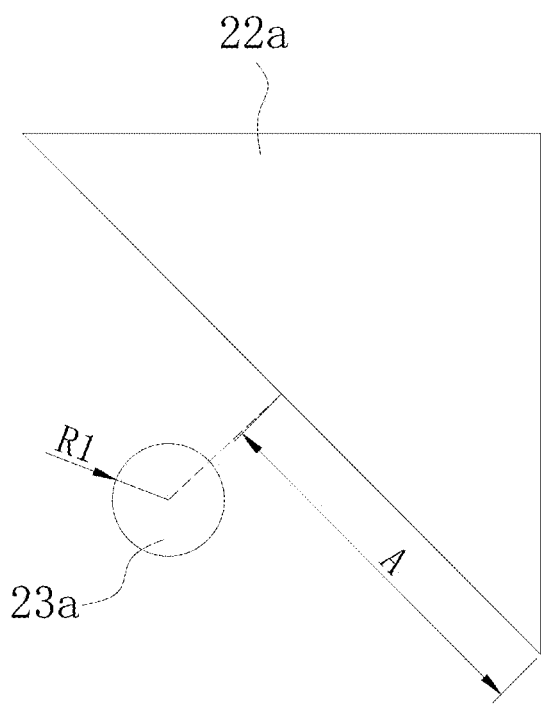
FIG. 17 is a schematic view of a light reflection element and a rotation axis thereof in the related art, which shows that the light reflection element is in a state of rest.
Figure 18:
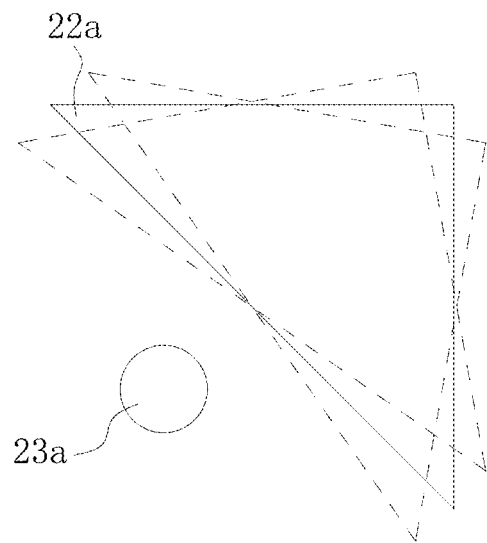
FIG. 18 is schematic view of a light reflection element and a rotation axis thereof in the related art, which shows that the light reflection element is in a state of motion.
Figure 19:
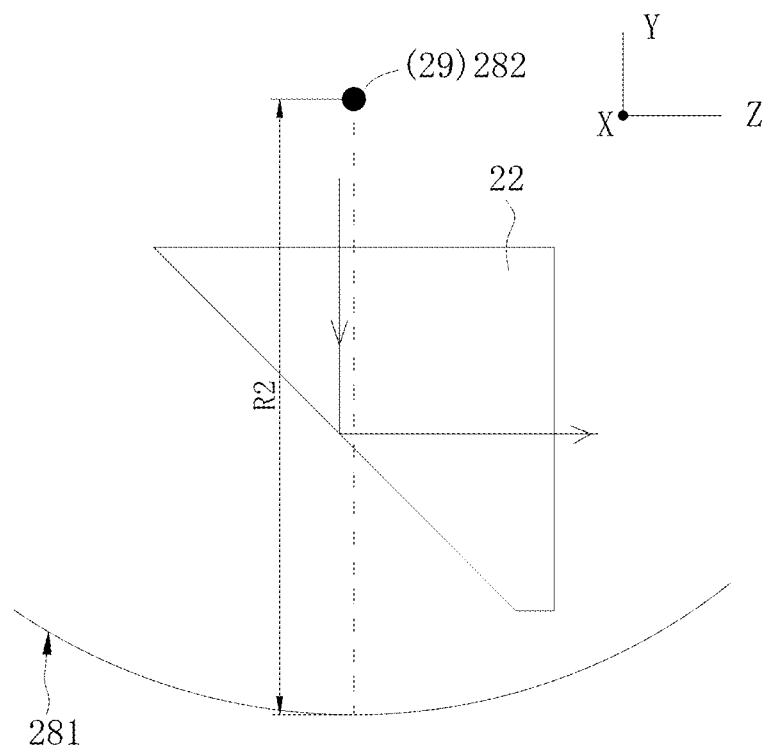
FIG. 19 is schematic view of a light reflection element and a rotation axis thereof according to an embodiment of the present disclosure, which shows that the light reflection element is in a state of rest.
Figure 20:
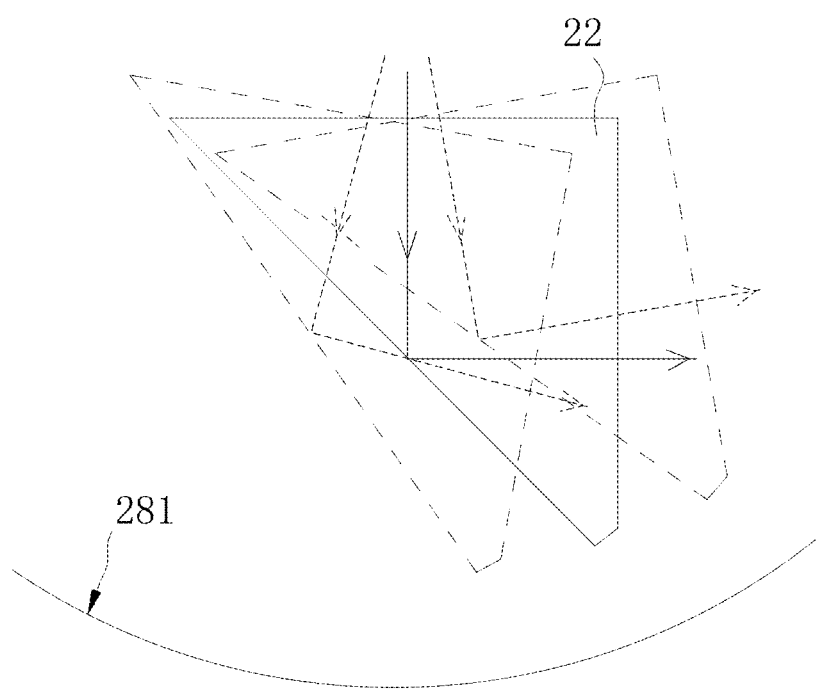
FIG. 20 is schematic view of a light reflection element and a rotation axis thereof according to an embodiment of the present disclosure, which shows that the light reflection element is in a state of motion.

To be specific, referring to FIG. 17 and FIG. 18, in the related techniques in the art, the mounting base (not shown) is connected to the rotation roller 23a, wherein the mounting base rotates around the rotation roller 23a to drive the light reflection element 22a to rotate at the same time. Referring to FIG. 19 and FIG. 20, in the present disclosure, the mounting base 23 may rotate along the curved track 281, which may have radius of R2. The R2 may not be limited by the size of the light reflection element 22. At this situation, the rotation accuracy of the light reflection 22 may be improved to achieve a high effect of optical image stabilization of the first imaging module 20.

In some embodiments, the mounting base 23 may include a curved face 231, which may match with the curved track 281. In other words, the center axis of the curved face 231 and the center axis of the curved track 281 may coincide. Therefore, the mounting base 23 and the driving device 28 may cooperate more tightly.

In some embodiments, the central axis 282 may be defined outside of the first imaging module 20, so that the radius R2 of the curved track 281 may be a large value, which may reduce the adverse effect of the friction to the mounting base 23 rotation.

In some embodiments, the driving device 28 may be formed at the bottom of the shell 21. In other words, the driving device 28 and the shell 21 may be formed of a single piece. Therefore, the structure of the first imaging module 20 may be more compact.

In some embodiments, the driving device 28 may drive the mounting base 23 to rotate via electromagnetism. In an embodiment, the driving device 28 may include coils, and electromagnetic chips may be configured to the mounting base 23. When the processor 104 allows the electric current to pass through the coils, a magnetic field may be generated to drive the electromagnetic chips to move, which may further drive the mounting base 23 and the light reflection 22 to rotate.

In other embodiments, the processor 104 may control the driving device 28 to drive the mounting base 23 to move by the piezoelectric or memory alloy means. Piezoelectric driving and memory alloy driving may be referred to the above description, which will not be repeatedly described herein.

Figure 11:
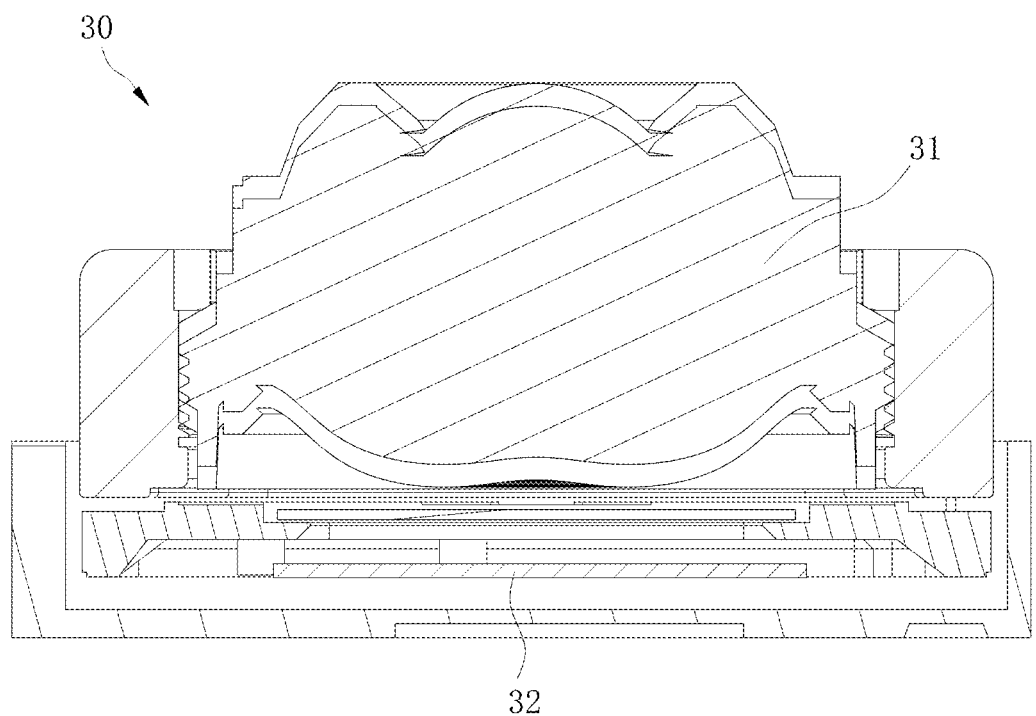
FIG. 11 is a sectional view of a second imaging module according to an embodiment of the present disclosure.

Referring to FIG. 11, in the present embodiment, the second imaging module 30 may be a vertical camera module; in other embodiments, the second imaging module 30 may be a periscope type camera module. The second imaging module 30 may include a second lens assembly 31 and a second image sensor 32, wherein the second lens assembly 31 may be adapted to form images on the second image sensor 32, the light incident axis of the second imaging module 30 may be coincide with the light axis of the second lens assembly.

In the present embodiment, the second imaging module 30 may be a fixed-focus lens module, so that the second lens assembly 31 may contain fewer of the lenses 241. Therefore, the height of the second imaging module 30 may be smaller, which may reduce the thickness of the electronic apparatus 1000.

The type of the second image sensor 32 may be the same as that of the first image sensor 26, which will not be repeatedly described herein.

To summarize, embodiments of the present disclosure may provide the first imaging module 20, which may include the shell 21, the light reflection element 22, the mounting base 23, the first image sensor 26, and the driving device 28, wherein the light reflection 22, the mounting base 23, and the first image sensor 26 may all be arranged inside the shell 21.

The shell 21 may define the light incident hole 211, the light reflection element 22 may be fixed on the mounting base 23 and configured to reflect the incident light entering from the light incident hole 211 to reach the first image sensor 26, so that the first image sensor 26 may sense the incident light out of the first imaging module 20.

Based on the data sent from the gyro 106, which may be arranged on the mainboard 108 separately from the first imaging module 20, the processor 104 may control the driving device 28 to drive the mounting base 23 carrying the light reflection element 22 to rotate around and move along the axis 29. The rotation axis 29 may be perpendicular to the axial direction of the light incident hole 211 and the photosensitive direction of the first image sensor 26. Therefore, the first image module 20 may achieve the optical image stabilization along the light axis of the light incident hole 211 and direction of the rotation axis 29.

Additional gyro for detecting shaking data of the first imaging module 20 independently, and additional processor for controlling the driving device independently are not required in the first imaging module 20 of the present disclosure. Therefore, the optical image stabilization may be achieved by the first imaging module 20 along two directions, and at the same time, the size of the first imaging module 20 may be smaller, allowing the miniaturization of the first imaging module 20.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:
1. An electronic apparatus, comprising:
a processor;
a gyro; and
an imaging module, arranged on a mainboard of the electronic apparatus and separated from the gyro and the processor, wherein the imaging module comprises:
a shell, defining a light incident hole; and
a light reflection element, a mounting base, an image sensor and a driving device which are arranged in the shell; the light reflection element is fixed on the mounting base and configured to reflect light inci- dent from the light incident hole to the image sensor, such that the image sensor senses the incident light; and wherein the processor is configured to control the driving device to drive the mounting base with the light reflection element to rotate around a rotation axis based on feedback data sent from the gyro, such that optical image stabilization along an axial direction of the light incident hole is achieved, and the rotation axis is perpendicular to the axial direction of the light incident hole; and wherein the processor is further configured to control the driving device to drive the mounting base with the light reflection element to move along an extending direction of the rotation axis based on the feedback data sent from the gyro.

2. The electronic apparatus according to claim 1, wherein the rotation axis and the axial direction of the light incident hole are perpendicular to a photosensitive direction of the image sensor, such that optical image stabilization is achieved along the extending direction of the rotation axis.

3. The electronic apparatus according to claim 2, wherein the driving device defines a curved track, the processor is configured to control the driving device to drive the mounting base to rotate along the curved track and around a central axis of the curved track, or move along an extending direction of the central axis, wherein the central axis coincides with the rotation axis.

4. The electronic apparatus according to claim 3, wherein the mounting base comprises a curved face concentric with and fitting with the curved track.

5. The electronic apparatus according to claim 3, wherein the driving device is arranged at a bottom of the shell.

6. The electronic apparatus according to claim 1, wherein the driving device is adapted to drive the mounting base to rotate by electromagnetism or piezoelectricity.

7. The electronic apparatus according to claim 1, wherein the light reflection element comprises:
a light incident face, arranged close to and toward the light incident hole;
a light reflection face, connected to the light incident face and inclined relative to the light incident face; and
a light exit face, connected to the light incident face;
wherein the incident light enters to the light incident hole from the light incident face, and is reflected by the reflection face to change direction and emitted from the light exit face.

8. The electronic apparatus according to claim 7, wherein the light reflection element further comprises a backlight face arranged away from the light incident hole and opposite to the light incident face; and the backlight face connecting the light reflection face and the light exit face.

9. The electronic apparatus according to claim 8, wherein the light incident face is parallel to the backlight face.

10. The electronic apparatus according to claim 7, wherein the axial direction of the light incident hole is perpendicular to the light incident face.

11. The electronic apparatus according to claim 1, wherein the imaging module comprise:
an action element, arranged between the light reflection element and the image sensor and inside the shell;
a lens assembly, fixed on the action element; and
a driving mechanism, connected to the shell and the action element, wherein the processor is configured to control the driving mechanism to drive the action element to move along a light axis of the lens assembly, such that images are focused and formed by the lens assembly on the image sensor.

12. The electronic apparatus according to claim 11, wherein the action element has a configuration of tubular; and
the lens assembly comprises a plurality of lenses fixed in the action element along an axis direction of the action element and spaced apart from each other.

13. The electronic apparatus according to claim 11, wherein the action element comprises two clamping pieces, the lens assembly is sandwiched between the two clamping pieces.

14. The electronic apparatus according to claim 1, further comprises a decoration component arranged on the imaging module and surrounding a periphery of the light incident hole.

15. The electronic apparatus according to claim 14, wherein the shell comprises a top wall and a side wall connected to a side edge of the top wall;
the light incident hole is defined in the top wall; and
the top wall further defines a groove on a side of the light incident hole, a part of the decoration component is embedded into the groove;
wherein the decoration component defines a through hole, the light incident hole is exposed to the outside through the through hole, and the imaging module are configured to collect external images through the through hole.

16. The electronic apparatus according to claim 15, wherein the groove is defined at the connected position of the top wall and the side wall, and the decoration component is configured to abut against the top wall.

17. The electronic apparatus according to claim 16, wherein the number of the side wall is two, the side walls are opposite to each other; and the number of the groove is two, the groves are opposite to each other.

18. An electronic apparatus, comprising:
a housing;
an imaging module, received in the housing and comprising:
a shell, defining a light incident hole;
a light diverting member, received in the shell, rotatably connected to the shell, and configured to divert the light; and
an imaging element, received in the shell and configured to receive the diverted light and image;
a gyro, fixed in the housing and out of the imaging module, and configured to detect shake of the electronic apparatus to obtain shaking data; and
a processor, fixed in the housing and out of the imaging module, and configured to control the light diverting member to rotate around a rotation axis and move along an extending direction of the rotation axis based on the shaking data sent from the gyro;
wherein a rotation axis is perpendicular to an axial direction of the light incident hole, and both the rotation axis and the axial direction of the light incident hole are perpendicular to a photosensitive direction of the image.

19. A mobile terminal, comprising:
a housing; and
a mainboard, a processor, a gyro, and an imaging module received in the housing;
wherein the processor, the gyro, and the imaging module are arranged on the mainboard and separated from each other;

wherein the gyro is configured to detect an action of the mobile terminal to obtain action data; and the imaging module comprises:
- a shell, defining a light incident hole; and
- a light reflection element, a mounting base, an image sensor and a driving device arranged in the shell; wherein
  - the light reflection element is fixed on the mounting base and configured to reflect light incident from the light incident hole to the image sensor;
  - the mounting base is rotatably connected to the shell and configured to rotate around a rotation axis;
  - the image sensor has a photosensitive direction and is configured to sense incident light outside of the imaging module; and
  - the driving device is configured to drive the mounting base to rotate; and the processor is configured to control the driving device to drive the mounting base to rotate around a rotation axis based on the action data sent from the gyro, such that the light reflection element rotates with the mounting base;

wherein the processor is further configured to control the driving device to drive the mounting base with the light reflection element to move along an extending direction of the rotation axis based on the feedback data sent from the gyro; and wherein the rotation axis is perpendicular to an axial direction of the light incident hole, and both the rotation axis and the axial direction of the light incident hole are perpendicular to the photosensitive direction of the image.

\* \* \* \* \*